US007065753B2

(12) United States Patent
Osborne

(10) Patent No.: US 7,065,753 B2
(45) Date of Patent: Jun. 20, 2006

(54) METHOD, SYSTEM AND COMPUTER PROGRAM FOR SYNTAX VALIDATION

(75) Inventor: Andrew James Osborne, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 09/930,598

(22) Filed: Aug. 15, 2001

(65) Prior Publication Data

US 2002/0026308 A1 Feb. 28, 2002

(30) Foreign Application Priority Data

Aug. 30, 2000 (GB) ................................ 0021148.2

(51) Int. Cl.
*G06F 9/45* (2006.01)

(52) U.S. Cl. ........................ 717/143; 717/141; 717/142

(58) Field of Classification Search .................... 704/9, 704/10; 717/145, 5, 100, 143, 136, 158, 717/141, 142; 706/60
See application file for complete search history.

(56) References Cited

U.S. PATENT DOCUMENTS

| | | | | |
|---|---|---|---|---|
| 5,325,531 A | * | 6/1994 | McKeeman et al. | 717/145 |
| 5,546,507 A | * | 8/1996 | Staub | 706/60 |
| 5,581,696 A | | 12/1996 | Kolawa et al. | 714/38 |
| 5,678,052 A | | 10/1997 | Brisson | 704/4 |
| 5,845,126 A | | 12/1998 | Ju et al. | 717/114 |
| 5,899,999 A | * | 5/1999 | De Bonet | 707/104.1 |
| 6,378,126 B1 | * | 4/2002 | Tang | 717/143 |

FOREIGN PATENT DOCUMENTS

| | | |
|---|---|---|
| EP | 0503944 | 9/1992 |
| EP | 0801346 | 10/1997 |
| RU | 2103728 | 1/1998 |

OTHER PUBLICATIONS

"Compilers, Principles, Techniques, and Tools", by Alfred V. Aho et al. 1986.*
Patricia Seybold Group, "Enterprise JavaBeans™ Technology", "Server Component Model for the Java™ Platform" by Anne Thomas, revised Dec. 1998, Prepared for Sun Microsystems, Inc., pp. 1-24.
"Complier Principles, Techniques and Tools", Aho et al, Addison-Wesley Publishing Company, 1986, PP 1-15, pp. 392-393, pp. 432-433, pp. 562-565.
"The Essense of Compliers", Hunter, Prentice Hall, 1999, pp. 42-43.
"One—Pass, Optimal Tree Parsing-With or Without Trees", Proebsting et al., CC'96, Apr. 1996.

\* cited by examiner

*Primary Examiner*—Tuan Dam
*Assistant Examiner*—Chih-Ching Chow
(74) *Attorney, Agent, or Firm*—Gregory M. Doudnikoff; George E. Grosser

(57) ABSTRACT

A system, method and computer program for validating a syntactical statement employing a stored syntax tree which represents all possible syntax options. The tree consists of a network of junction nodes and data nodes between a root node and an end node, whereby all paths through the tree lead to the end node. Firstly, a syntactical statement is passed to the root node, where it is parsed into elementary tokens. Next, a table is created to store the tokens, and entries representing the end node of the syntax. The location of a current node in the syntax tree is also maintained, whereby the current node is initially the root node. Then, the potential nodes that can be selected from the current node and their distances from the current node are returned. The potential nodes are then compared to the stored tokens, and a potential node is selected. Finally, the location of the current node is updated and the process is repeated until the syntactical statement has been validated.

37 Claims, 5 Drawing Sheets

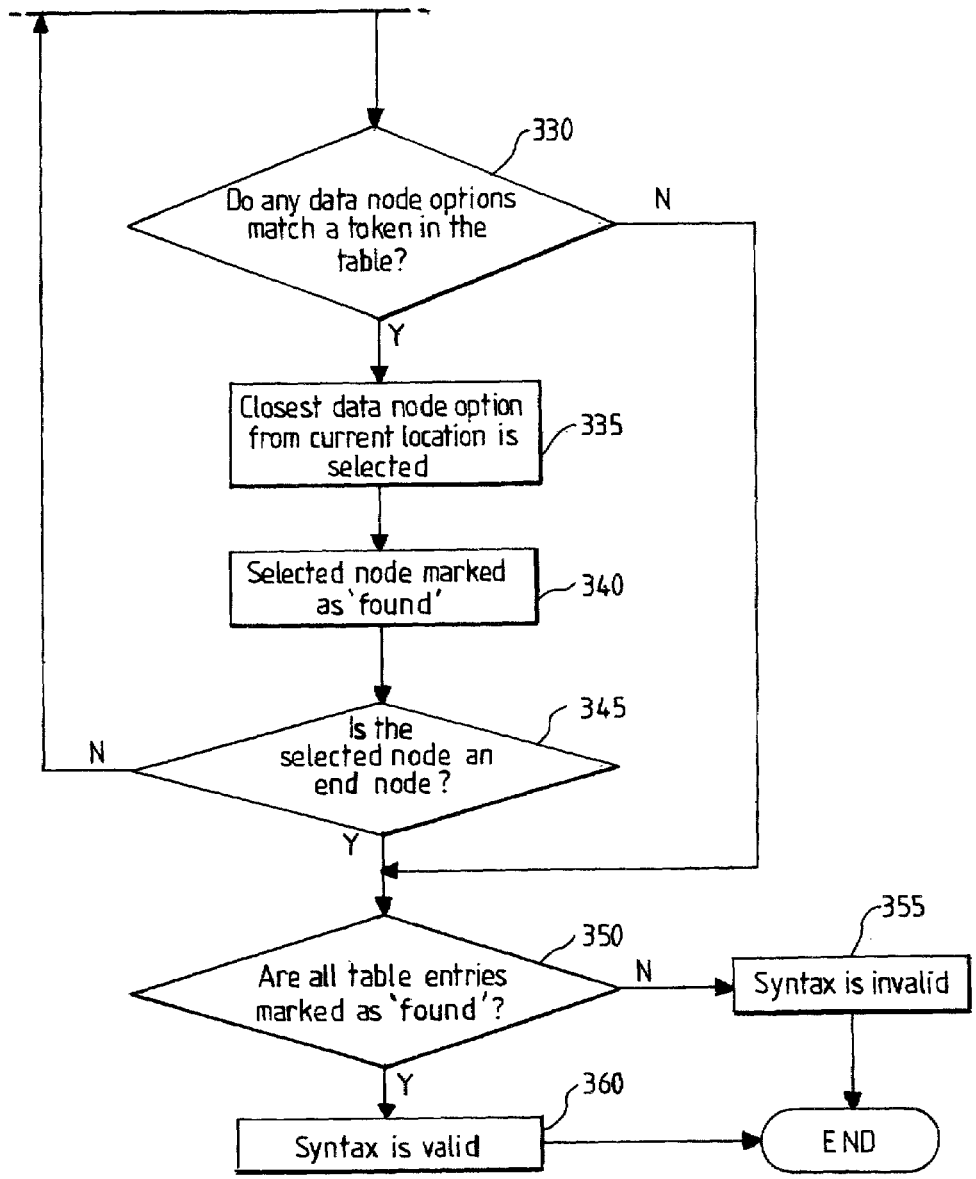
FIG. 3 Continued from Sheet 3

| | Found ? |
|---|---|
| a | |
| c | |
| d | |
| End Node | |

| | Found ? |
|---|---|
| a | |
| d | |
| End Node | |

| | Found ? |
|---|---|
| a | |
| d | |
| c | |
| End Node | |

METHOD, SYSTEM AND COMPUTER PROGRAM FOR SYNTAX VALIDATION

FIELD OF THE INVENTION

The present invention relates to the field of syntax validation and more particularly to syntax trees.

BACKGROUND OF THE INVENTION

The compilation process involves translating the source code of a computer program into object code for execution of that program. Syntax analysis is a major part of the analysis phase in the compilation process and is used to determine the overall structure and meaning of a program.

One form of syntax that can be analysed is Backus Naur Form (BNF). BNF provides a formal text-based notation to describe the syntax of a given programming language, including symbols and characters. This form of syntax can be displayed graphically as a hierarchical syntax tree, whereby a graphical representation is believed to be easier to manipulate and understand. Further information on syntax trees can be found in "Compilers Principles, Techniques and Tools" by Alfred V. Aho et al, Addison-Wesley Publishing Company, 1986.

Generally, to create a syntax tree, the syntax represented by the tree is broken down into the syntax's tokens, whereby tokens are parts of the syntax that cannot be reduced any further. The tokens form nodes in the main tree and any branching in the syntax is represented by sub-trees. In the case of a syntax tree, the nodes represent arguments and operations of a computer program, whereby children nodes represent the operations. Similarly a parse tree represents the grammatical phrases of a computer program, whereby the nodes represent tokens of a textual string. FIG. 1 shows a diagram of a prior art syntax tree, with a start node 100 and multiple end nodes 110–160. To determine the structure of the tree, a syntax analyser needs an understanding of the order in which the symbols in a program may appear.

To derive a valid representation of the syntax of a command, a route from the start node to any of the end nodes must be identified. The tree is traversed to find a valid route and there are various known methods to accomplish this, of which further information can be found in "The Essence of Compilers" by Robin Hunter, Prentice Hall, 1999. Known methods include top-down traversing whereby a route from the start node to an end node is found. Conversely, bottom-up traversing finds a route from the end nodes to the start node. A mixed approach combines top-down and bottom-up traversing, whilst horizontal approaches, such as, left-right traversing or right-left traversing or even diagonal approaches are also valid.

To complete the review of the prior art, U.S. Pat. No. 5,678,052 discloses how text based BNF grammar may be represented graphically by a compressed railroad diagram. For a selected grammar rule within the text-based grammar, a space required within the compressed railroad diagram is determined. Thereafter, a space required is added to a total space required for the compressed railroad diagram. If the selected grammar rule includes a non-terminal symbol, then a grammar rule within the text-based grammar which defines the non-terminal symbol is used as the selected grammar rule, and the method is repeated provided that the total space required does not exceed a predetermined space available for the compressed railroad diagram. The compressed railroad diagram is generated based upon each selected grammar rule. However, the patent is not concerned with syntax analysis, but only with syntax representation.

The current representation of the structure of syntax and parse trees has problems associated with it in that due to the multiple end nodes in a tree, the representation in memory of the tree is an overhead. Additionally, the process of traversing or stepping through the tree is time consuming and order dependent. Furthermore, current trees are not flexible enough to handle situations where parameters in commands are specified in any order.

Therefore, there is a need for providing a more compact representation of a syntax or parse tree in memory, whilst also allowing for syntax analysis of parameters in a command which may be specified in any order.

SUMMARY OF THE INVENTION

Accordingly the present invention provides a method of validating a syntactical statement employing a stored syntax tree representing all possible syntax options by means of a network of junction nodes and data nodes between a root node and an end node, such that all paths through the tree lead to the end node, said method comprising the steps of passing said syntactical statement to the root node and parsing said syntactical statement into elementary tokens in the root node; creating a table to store the tokens, and entries representing the end node of the syntax; maintaining the location of a current node in the syntax tree, whereby said current node is initially the root node; returning potential nodes that can be selected from the current node and their distances from the current node; in response to said returning step, comparing the potential nodes to the stored tokens and selecting a potential node of said potential nodes; updating the location of the current node, and repeating said returning, comparing and selecting steps until the syntactical statement has been validated.

According to other aspects, the invention also provides a system and a computer program for validating a syntactical statement employing a stored syntax tree, analogously to the method of the invention.

It is a preferred feature of the present invention that the creating step further comprises the step of initially marking the tokens and end node entries in the table as "not found". Furthermore, the distance between a potential node and the current node is measured by enumerating the number of nodes between the potential node and the current node.

In another preferred feature, the step of selecting a potential node further comprises the steps of verifying successfully if the potential node corresponds to a stored token; verifying successfully if the potential node is closest in distance to the current node compared with the remaining potential nodes, and marking the stored token as "found" in the table. Furthermore, the repeating step further comprises the steps of confirming the syntactical statement is valid if all stored tokens, including the end node entry in the table are marked as "found", if the end node is reached.

In yet another preferred feature, the syntax tree comprises branched nodes representing optional tokens or a start node of a sub-tree. Preferably, in the case where the branched node represents a start node of a sub-tree, the sub-tree comprises further junction nodes and/or data nodes. Furthermore, sub-trees are nested hierarchically if a sub-tree comprises at least one further start node of a sub-tree. Specifically for sub-trees, the comparing step further includes the step of verifying successfully if a potential node is a start node of a sub-tree.

Preferably, the junction nodes are linked to any number of junction nodes or data nodes, whereas the data nodes are only linked to a single junction node. Additionally, the syntactical statement comprises of a textual string.

The present invention further provides a syntax checker comprising a stored syntax tree representing a body of valid syntax; and a table for holding elementary tokens of syntax making up a syntactical statement to be checked; said syntax tree comprising root and end node objects joined by a network of junction node objects and data node objects, said data node objects representing options in the syntax including tokens, such that each junction node object may link to an unlimited number of other junction node objects and data node objects, and each data node object only links to a singular junction node object, whereby all pathways through the network eventually terminate in said end node object: each of said junction node objects, being effective to evaluate linked data node options following said junction node object so that any tokens in said table corresponding to a linked data node object are marked as "found", whereby said syntactical statement is progressively compared with said syntax tree either until said end node is reached, indicating the syntax of the statement is valid, or until a corresponding data object is not found, indicating said syntax is not valid.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

Figure 2:
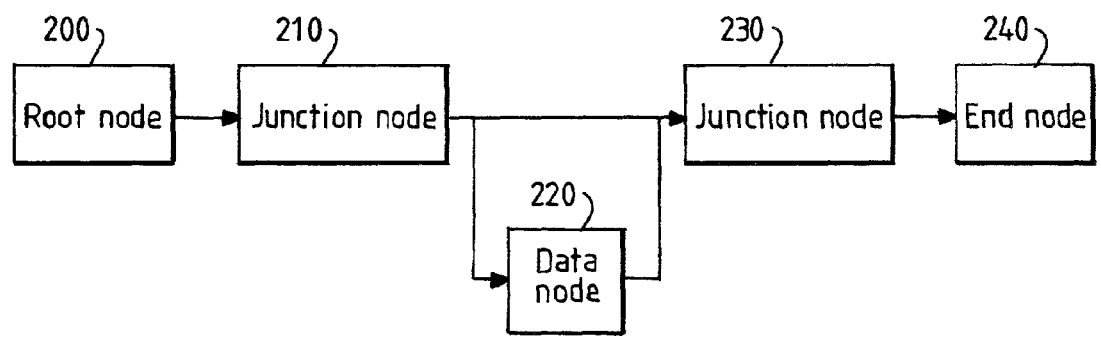
FIG. 2 shows a block diagram of a syntax tree according to the present invention.

Referring to FIG. 2, there is shown a block diagram of one general structure of a syntax tree, according to the present invention. Preferably, the tree is implemented using object-oriented programming and represents textual strings. It should be understood that the tree could be implemented in any other way, and also that the tree could represent non-textual syntax. In FIG 2, the root node 200 is the start node of a tree, whereby a complete tree represents an entire string of validated syntax. The body of the tree consists of two node types, namely junction nodes 210, 230 and data nodes 220.

In the preferred embodiment, nodes are implemented as objects. Junction nodes are objects which are responsible for creating data nodes, in that junction node objects evaluate further portions of the tree as will be described herein. Generally, a junction node 210 is always present immediately before a data node 220. A data node object holds tokens which represent the parameters of the syntax. Furthermore, a junction node 210 can link to any number of other junction nodes 230 or data nodes 220 however a data node 220 can only link to one junction node 210. Preferably, the root node is a junction node and additionally, links can only go forward.

In the preferred embodiment and generally according to the invention, a tree is implemented so that the junction and data nodes connect back together at an end node 240, further details of which are described herein. An end node object does not link to any other node objects.

Figure 2A:
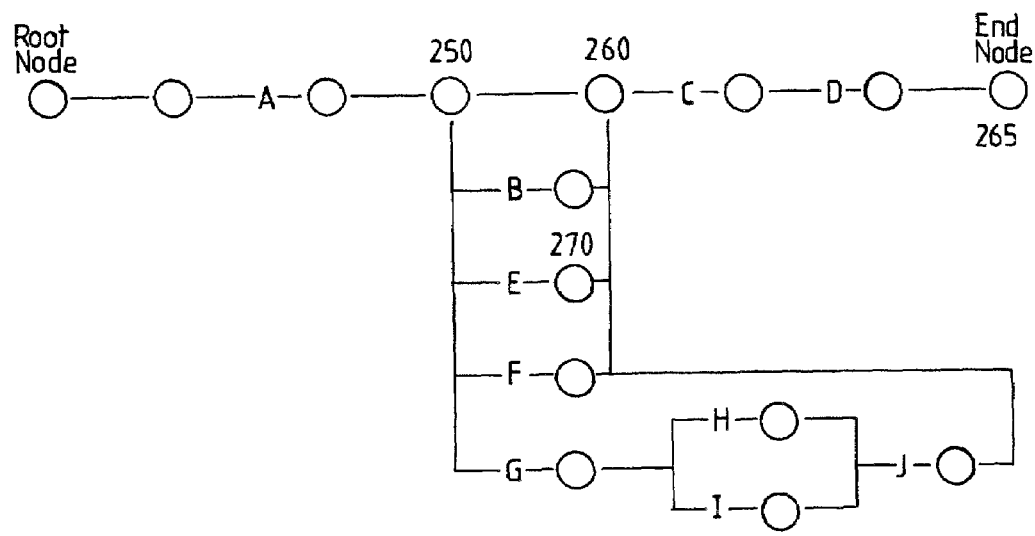
FIG. 2A shows a schematic representation of a more detailed syntax tree according to the present invention.

FIG. 2A shows a more detailed syntax tree, whereby the letters A–J are data nodes representing tokens in the syntax and the circles are junction nodes. Branched data nodes B, E, F, G, H, I and J represent options in the syntax. The branches may occur due to optional parameters in the syntax, such as nodes B, E, F, G and J or due to mutually exclusive parameters, such as nodes H and I.

Figure 2B:
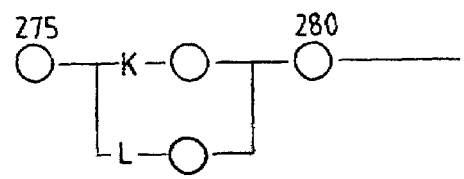
FIG. 2B shows a schematic representation of a sub-tree of the syntax tree in FIG. 2A according to the present invention.

A branched node can also represent a start node, whereby the start node is indirectly linked to at least one other data node. In this case, a sub-tree is formed. Specifically, in FIG. 2A, data node 'E' does not represent can optional parameter or a mutually exclusive parameter, however, it represents the start node of sub-tree 'E', whereby sub-tree 'E' contains further data nodes K and L as shown in FIG. 2B. Sub-trees are nested hierarchically when a sub-tree comprises at least one further start node of a sub-tree.

From FIGS. 2, 2A and 2B it can be seen that the structure of the tree has one entry point and one exit point, whereby any route from entry to exit represents a valid expression of the encoded syntax. In other words, the syntax tree is in the form of a single chain of nodes, with re-linking parallel branches.

One example of syntax that may be passed to such a tree for validation, is found in IBM's CICS Transaction Server family, a family of middleware programs. ("CICS" is a registered trademark of International Business Machines Corporation). CICS has its own Application Programming Interface, which includes some 200 distinct "EXEC CICS" commands and many more options (parameters) on those commands. For example, in source form, an EXEC CICS command takes the form:

EXEC CICS function option(arg) option

The functions are actions like READ, SEND etc. and the options are parameters associated with the function which consist of a keyword and, in some cases, an argument (value) in parenthesis after the keyword. For example, the options for the READ command include FILE, RIDFLD, UPDATE and others. FILE is the name of the file to be read and is always followed by a value indicating or pointing to the file name. RIFDFLD is a record identification field or key and also needs a value whereas UPDATE simply indicates a change to the record and doesn't need a value. So to read, with intent to modify, a record from a file known to CICS as ACCTFIL, using a key stored in working storage as ACCTC, the command would be:

EXEC CICS READ FILE ('ACCTFIL') RIDFLD(ACCTC) UPDATE

Since there is a unique syntax for every CICS command, in that each command can have varying numbers and types of options, using the example above, a single syntax tree may represent the valid syntax for EXEC CICS READ. Similarly, an additional syntax tree will represent EXEC CICS SEND and so on.

The creation of the structure of the tree is now described in more detail. In the preferred embodiment, the root node of the tree is initially created when a textual syntax definition is passed to it. If the syntax is empty the root node carries out no more processing. Generally, the root node parses the syntax and the rest of the syntax tree is formed recursively by creating further junction nodes and data nodes as required.

Referring to FIGS. 2A and 2B, typically, if a branch in the syntax occurs, branched data nodes are created. If a branched data node represents the start node of a sub-tree, the sub-tree is connected in between a current node 250 of the tree and the node 260 immediately following the current node 250. Specifically, the syntax definition is passed to the start node 275 of the sub-tree, whereby the start node 275 is a junction node that represents a certain branch. Now, the start node 275 of the sub-tree creates nodes to represent a subsection of the syntax.

Control returns to the start node 275 of the sub-tree once the end node 280 of the sub-tree is created and the branch in the syntax has been represented. A check is now made on the end node 280 to ensure that it is not the end node 265 of the main tree. If it is not and further syntax is to be represented, control passes to the node 270 immediately after the data node 'E' which represents the sub-tree. From this point, any remaining syntax is processed and finally, control passes back up to the node 260 immediately following the current node 250. In this way, the remaining syntax is linked to the main tree.

In a similar way, if a token, that is, a parameter is present in the syntax, a data node to contain the token is created. If any syntax remains to be represented, control passes to the node immediately after the data node, in order to continue to represent the remaining syntax.

When there is no remaining syntax to be represented, the newly created junction nodes and data nodes are connected back to the initially created root node. Finally, the last junction node in the main chain is connected to the end node of the main chain. Now the syntax tree is complete, and has one start point, namely the initially created root node, and one exit point, namely the end node.

Therefore, the preferred embodiment of the present invention has major benefits over prior art representations of syntax trees in that it provides a method for creating nodes, which can be connected together in an inclusive way. However, the resulting collection will still only have a single entry and exit point, thereby reducing the overall number of nodes. This results in the tree being compact and finite.

Figure 3:
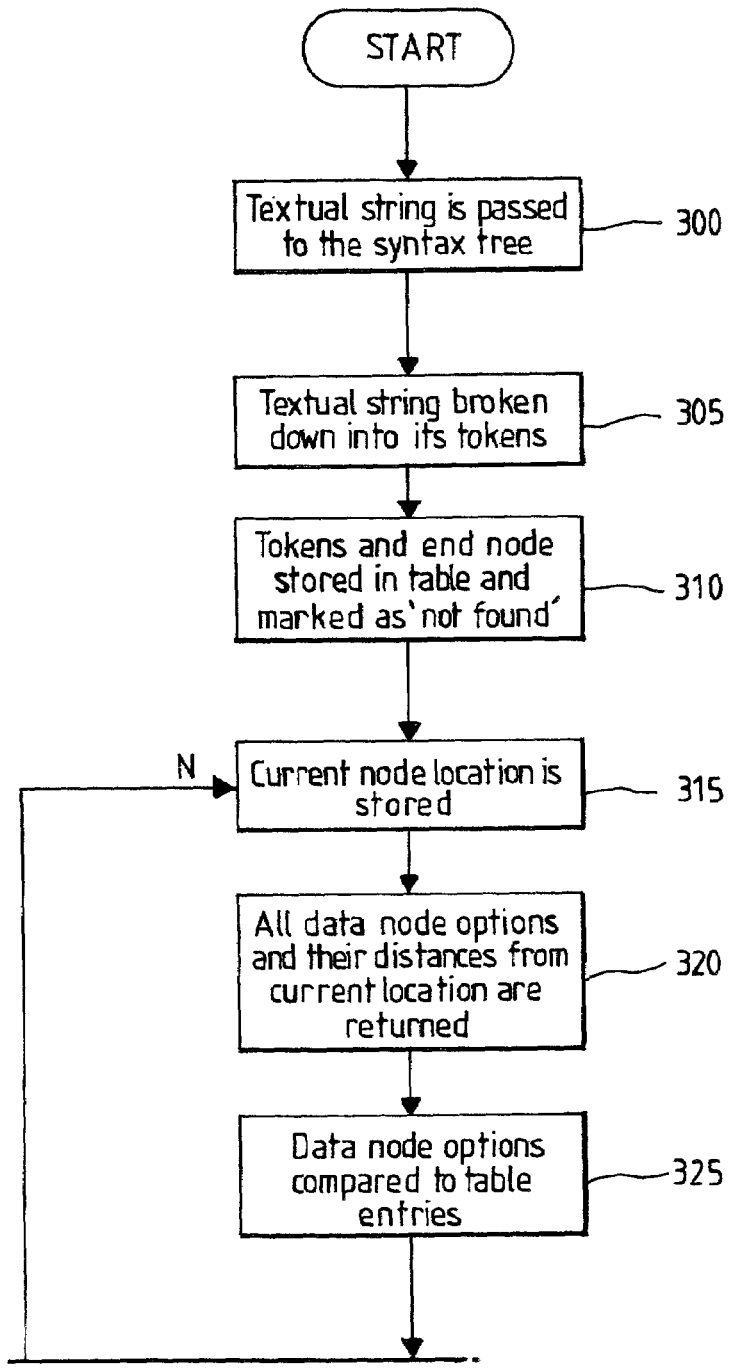
FIG. 3 is a flow chart showing the operational steps involved in traversing a syntax tree according to the present invention.

FIG. 3 is a flow chart showing the process of checking the syntax of an arbitrary textual string by comparing it with the syntax tree already generated. In the use of a CICS API command, the appropriate tree is selected by lookup based on the name of the CICS command. In the preferred embodiment, the searching is implemented using a prior art left-right traverse of the tree. It should be understood that the process of traversing a syntax tree could be implemented using other methods known in the art.

Figures 4, 4A, 4B, 4C:
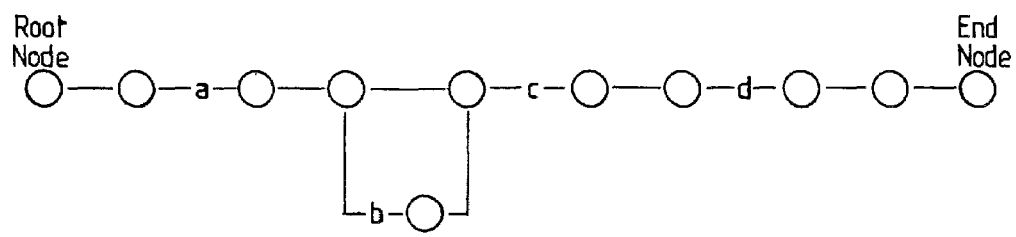
FIG. 4 shows an example of a syntax tree for validating commands according to the present invention.
FIGS. 4A–4C show tables containing the tokens of commands to be validated against the syntax tree of FIG. 4.

After the tree is created using the mechanism described herein, it stores a known and valid representation of syntax. In the validation stage, referring to FIG. 3, firstly, a textual string to be validated is passed to the tree in step 300. The textual string is split by the root node 200, into its separate tokens in step 305, which are then stored in a table in step 310, an example of which is shown in FIG. 4a. If the syntax is valid, each token should correspond to a respective data node of the tree. An entry representing the end node of the main tree is also added to the table in step 310, and each entry in the table is initially set as "not found". Additionally, in step 315 the current location in the syntax tree is stored, whereby initially the current location is the root node. Storing the location of the current node acts as a marker, so that when traversing continues, the position in the tree that was last reached is known.

The tree is then traversed, by searching for a route that matches the tokens in the table. To ensure that the validation is thorough, the shortest route through the syntax tree is always taken. Therefore, the process of traversing involves returning all the data node options that can be selected from the current node. A data node option is any data node that is directly accessible from the current node. The distances of the data node options from the current node are also returned in step 320. Specifically, the distance is measured by enumerating how many nodes away the data node option is from the current node.

Next, the data node options are evaluated against the table in step 325. If a data node option in the passed syntax matches a token stored in the table at step 330 and the data node option is also closest in distance to the current node, the data node option is selected in step 335 and becomes the current location. The data node option is marked as found in the table in step 340. In the preferred embodiment, when a data node option is chosen, processing moves to the junction node immediately after that chosen data node option.

If the end node is not encountered in step 345, step 315 is repeated, whereby the current location in the syntax tree is stored and the traversing is repeated until the end node is encountered. When the end node is encountered, it is marked as found in the table. If the closest data node option in the syntax tree does not match a token stored in the table in step 330 or if the end node was found in step 345, then all tokens in the table are checked to ensure that they have also been marked as found in step 350. If all options within the passed syntax are marked as found, the syntax string that was supplied to the tree is pronounced valid in step 360. If some options are not marked as found, that is, if no further options match and no more branches are available to be explored, the validation has failed in step 355.

When a syntax tree contains sub-trees to be searched, the mechanism described below is followed. In the preferred implementation, sub-trees have names associated with them and these names exist within the main tree similar to the way in which any other option would. The sub-tree names are identified as such by:

A. not existing as an option name e.g. length

B. existing as a sub-tree name e.g. file_options.

Therefore, when a traverse is initiated on the main tree to return an option node, the traverse route is followed as described herein. However, when a data node option is encountered, an additional check is made before the data node options are returned in step 320 in FIG. 3. The check determines if the name of the data node option is in fact a sub-tree name. This could be implemented by checking the data node option name against a list of known option names.

If the data node option is found to be the name of a sub-tree, then control is transferred to the start node of that sub-tree. Traversing resumes as at step 325 in FIG. 3. To ensure processing does not fall off the end of a sub-tree or to ensure that the search does not finish at the end node of a sub-tree, the sub-tree is made aware of the node immediately after the start node of that sub-tree.

The above process is repeated until processing within the sub-tree has been completed, in which case control is passed to the node immediately after the start node of that sub-tree. It should be understood that the sub-trees could also be nested. In this way, traversing a tree outputs all permutations of valid syntax.

FIG. 4 shows an example of a syntax tree representing the syntax a <b> c d, whereby the brackets < > represent an optional branch. The letters a, b, c and d represent data nodes and the circles represent junction nodes. FIGS. 4A, 4B and 4C, show tables representing the following entries:

1) a c d
2) a d
3) a d c

For discussion purposes, the table will be repeated as text after each operation upon it. Nodes that have not been found will be represented in lower case and conversely, nodes that have been found will be represented in upper case. Additionally, the end node is represented as the character '.' when not found and '*' when found.

Referring to FIG. 4A
A. The root node evaluates the data node options available
B. The root node returns 'a' at distance 1.
C. 'a' is in the table and is also the closest to the root node
D. 'a' is marked as "found"
E. The result is [A c d .]
F. The node immediately after 'a' is selected and moved to
G. The node evaluates the data node options available
H. The node returns 'b' at distance 1 and 'c' at distance 2
I. 'c' is in the table and is the closest matching option
J. 'c' is marked as "found"
K. The result is [A C d .]
L. The node immediately after 'c' is selected and moved to
M. The node evaluates the data node options available
N. The node returns 'd' at distance 1
0. 'd' is in the table and is the closest matching option
P. 'd' is marked as "found"
Q. The result is [A C D .]
R. The node immediately after 'd' is selected and moved to
S. The node evaluates the data node options available
T. The node returns 'end node' at distance 1
U. 'end node' is in the table and is the closest node available compared to the other matching options
V. 'end node' is marked as "found"
W. The result is [A C D *]
X. Since the end node was detected, validation is terminated
Y. The table is evaluated and since all options have been marked as "found" the syntax is valid.

Referring to FIG. 4B
A. The root node evaluates the data node options available
B. The root node returns 'a' at distance 1
C. 'a' is in the table and is also the closest to the root node
D. 'a' is marked as "found"
E. The result is [A d .]
F. The node immediately after 'a' is selected and moved to
G. The node evaluates the data node options available
H. The node returns 'b' at distance 1 and 'c' at distance 2
I. No options match the table so the validation is arm aborted
J. The table is evaluated and since the end node and therefore all options have not been marked as "found" the syntax is invalid.

Referring to FIG. 4C
A. The root node evaluates the data node options available
B. The root node returns 'a' at distance 1
C. 'a' is in the table and is also the closest to the root node
D. 'a' is marked as "found"
E. The result is [A d c .]
F. The node immediately after 'a' is selected and moved to
G. The node evaluates the data node options available
H. The node returns 'b' at distance 1 and 'c' at distance 2
I. 'c' is in the table and is the closest matching option
J. 'c' is marked as "found"
K. The result is [A d C .]
L. The node immediately after 'c' is selected and moved to
M. The node evaluates the data node options available
N. The node returns 'd' at distance 1
0. 'd' is in the table and is also the closest to the node
P. 'd' is marked as "found"
Q. The result is [A D C .]
R. The node immediately after 'd' is selected and moved to
S. The node evaluates the data node options available
T. The node returns 'end node' at distance 1
U. 'end node' is in the table and is the closest node available compared to the other matching options
V. 'end node' is marked as "found"
W. The result is [A D C *]
X. Since the end node was detected, validation is terminated
Y. The table is evaluated and since all options have been marked as "found" the syntax is valid.

Generally, a syntax tree, according to a preferred embodiment of the present invention, determines whether or not a particular command is a valid representation, given the allowable syntax. Furthermore, instead of attempting to validate a string against a tree, the tree is validated against a table storing the tokens of a string. Since the tokens are not stored in a fixed order, the validation of a string is not order dependent. Also by storing the tokens in a table, each parameter is stored only once, resulting in a decreased overhead on storage.

Figure 1:
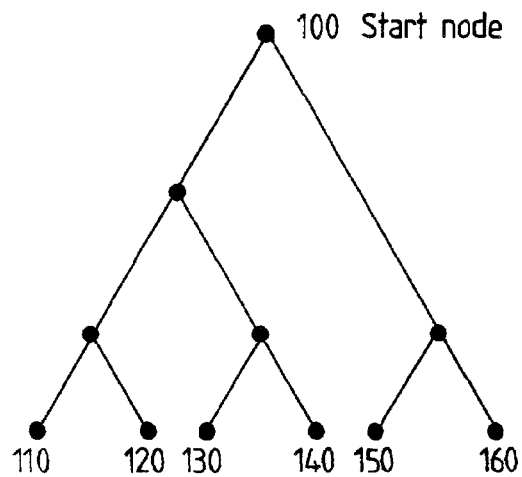
FIG. 1 shows a schematic representation of a prior art syntax tree.

Another benefit of the comparison being performed of the tree against the string's tokens is that failure strings are detected quickly. This is because if a failure of the validation process occurs, it is detected before the traverse of the tree is completed. However, in the prior art of FIG. 1, if the route from node 100 to node 160 is the valid route, then if a left-write traverse is performed, all the other routes have to be checked first. This obviously has a high overhead associated with it.

Additionally, since any tree or sub-tree can replace a data option node name in the main tree, a larger syntax is created from many smaller syntax definitions.

The syntax used in the preferred embodiment of the present invention is simple and is similar to BNF. Therefore the preferred embodiment of the present invention could be utilised to create a list of all the permutations of a BNF declaration, or alternatively to validate expressions against a BNF based syntax.

This invention claimed is:

1. A method, executed on a computer system, of validating a syntactical statement employing a stored syntax tree representing all possible syntax options by means of a network of junction nodes and data nodes between a root node and an end node, such that all paths through the tree lead to the end node, said method comprising the steps of:

passing said syntactical statement to the root node and parsing said syntactical statement into elementary tokens in the root node;

maintaining the location of a current node in the syntax tree, whereby said current node is initially the root node;

returning potential nodes that can be selected from the current node and their distances from the current node;

in response to said returning step, comparing the potential nodes to the stored tokens and selecting a potential node corresponding to one of said stored tokens if such a corresponding node exists;

updating the location of the current node to that of a selected node, repeating said returning, comparing and selecting steps wherein the syntactical statement as validated if the end node is reached.

2. A method as claimed in claim 1, further comprising the step of:
creating a table to store said tokens and an entry representing said end node and marking said tokens as "found" in response to said selection of a potential node.

3. A method as claimed in claim 2, comprising the further step of:
initially marking said tokens and end node entry in the table as "not found".

4. A method as claimed in claim 1, in which the distance between a potential node and said current node is measured by enumerating the number of nodes between said potential node and said current node.

5. A method as claimed in claim 2, in which said step of selecting a potential node further comprises the steps of:
verifying successfully if said potential node corresponds to a stored token;
verifying successfully if said potential node is closest in distance to said current node compared with the remaining potential nodes, and
marking said stored token as "found" in the table.

6. A method as claimed in claim 1, in which said syntax tree comprises branched nodes, whereby said branched nodes represent optional tokens or a start node of a sub-tree.

7. A method as claimed in claim 6, in which if a branched node represents a start node of a sub-tree, said sub-tree comprises further junction nodes and/or data nodes.

8. A method as claimed in claim 7, in which sub-trees are nested hierarchically if a sub-tree comprises at least one further start node of a sub-tree.

9. A method as claimed in claim 6, in which said comparing step further includes the step of:
verifying if a potential node is a start node of a sub-tree.

10. A method as claimed in claim 1, in which said junction nodes are linked to any number of junction nodes or data nodes and in which said data nodes are linked to a single junction node.

11. A method as claimed in claim 1, in which said syntactical statement comprises a textual string.

12. A computer system for validating a syntactical statement comprising:
a stored syntax tree representing all possible syntax options by means of a network of junction nodes and data nodes between a root node and an end node, such that all paths through the tree lead to the end node, whereby said syntactical statement is initially passed to the root node;
means for parsing said syntactical statement into elementary tokens in the root node;
a table to store the tokens, and entries representing the end node of the syntactical statement;
means for maintaining the location of a current node in the syntax tree, whereby said current node is initially the root node;
means for returning potential nodes that can be selected from the current node and their distances from the current node;
means for comparing the potential nodes to the stored tokens and means for selecting a potential node of said potential nodes corresponding to one of said stored tokens if such a corresponding node exists; and
means for updating the location of the current node; whereby said syntactical statement is valid if said end node is reached.

13. A computer system as claimed in claim 12, in which said system further comprises:
means for marking said tokens as "found" in response to selection of a potential node by said selecting means.

14. A computer system as claimed in claim 12 further including means for initially marking said tokens and end node entries in the table as "not found".

15. A computer system as claimed in claim 12, further comprising:
means for enumerating the number of nodes between said potential node and said current node, in order to provide the distance between a potential node and said current node.

16. A computer system as claimed in claim 12, in which said means for selecting a potential node further comprises:
first means for verifying if said potential node corresponds to a stored token; and
second means for verifying if said potential node is closest in distance to said current node compared with the remaining potential nodes.

17. A computer system as claimed in claim 12, in which said system further comprises:
if the end node is reached, means for confirming the syntactical statement is valid if all stored tokens, including the end node entry in the table are marked as "found".

18. A computer system as claimed in claim 12, in which said syntax tree further comprises:
branched nodes, whereby said branched nodes represent optional tokens or a start node of a sub-tree.

19. A computer system as claimed in claim 18, in which if a branched node represents a start node of a sub-tree, said sub-free comprises:
further junction nodes and/or data nodes.

20. A computer system as claimed in claim 19, in which said system further comprises:
means for nesting sub-trees hierarchically if a sub-three comprises at least one further start node of a sub-tree.

21. A computer system as claimed in claim 20, in which said comparing means further comprises:
means for verifying successfully if a potential node is a start node of a sub-tree.

22. A computer system as claimed in claim 12, in which said system further comprises:
junction nodes that are linked to any number of junction nodes or data nodes and data nodes that are linked to a single junction node.

23. A computer system as claimed in claim 12, in which said syntactical statement is a textual string.

24. A computer-implemented syntax checker comprising:
a stored syntax tree representing a body of valid syntax; and
a table for holding elementary tokens of syntax making up a syntactical statement to be checked;
said syntax tree comprising root and end node objects joined by a network of junction node objects and data node objects, said data node objects representing options in the syntax including tokens, such that each junction node object may link to an unlimited number of other junction node objects and data node objects, and each data node object only links to a singular junction node object, whereby all pathways through the network eventually terminate in said end node object;

each of said junction node objects, being effective to evaluate linked data node options following said junction node object so that any tokens in said table corresponding to a linked data node object are marked as "found", whereby said syntactical statement is progressively compared with said syntax tree either until said end node is reached, indicating the syntax of the statement is valid, or until a corresponding data object is not found, indicating said syntax is not valid.

25. A computer-implemented syntax checker as claimed in claim 24 wherein said syntax tree further comprises a sub-tree having a start node represented by a corresponding syntax option in a data node.

26. A computer-implemented syntax checker as claimed in claim 24 wherein said syntax tree comprises a plurality of sub-trees, nested hierarchically, each nested sub-tree having a respective start node represented by a corresponding syntax option in a data node.

27. A computer program recorded on a memory device consisting of instructions which, when executed on a computer, perform a method of validating a syntactical statement employing a stored syntax tree representing all possible syntax options by means of a network of junction nodes and data nodes between a root node and an end node, such that all paths through the tree lead to the end node, said method comprising the steps of:

passing said syntactical statement to the root node and parsing said syntactical statement into elementary tokens in the root node;

maintaining the location of a current node in the syntax free, whereby said current node is initially the root node;

returning potential nodes that can be selected from the current node and their distances from the current node;

in response to said returning step, comparing the potential nodes to the stored tokens and selecting a potential node corresponding to one of said stored tokens if such a corresponding node exists;

updating the location of the current node to that of a selected node, repeating said returning, comparing and selecting steps wherein the syntactical statement is validated if the end node is reached.

28. A computer program as claimed in claim 27, in which said method further comprises the step of:

creating a table to sotre said tokens and an entry representing said end node and marking said tokens as "found" in response to said selection of a potential node.

29. A computer program as claimed in claim 28, comprising the further method step of:

initially marking said tokens and end node entry in the table as "not found".

30. A computer program as claimed in claim 27, in which the distance between a potential node and said current node is measured by enumerating the number of nodes between said potential node and said current node.

31. A computer program as claimed in claim 27, in which said step of selecting a potential node further comprises the steps of:

verifying successfully if said potential node corresponds to a stored token;

verifying successfully if said potential node is closest in distance to said current node compared with the remaining potential nodes, and marking said stored token as "found" in the table.

32. A computer program as claimed in claim 27, in which said syntax tree comprises branched nodes, whereby said branched nodes represent optional tokens or a start node of a sub-tree.

33. A computer program as claimed in claim 32, in which if a branched node represents a start node of a sub-tree, said sub-tree comprises further junction nodes and/or data nodes.

34. A computer program as claimed in claim 32, in which sub-trees are nested hierarchically if a sub-free comprises at least one further start node of a sub-tree.

35. A computer program as claimed in claim 32, in which said method comparing step further includes the step of:

verifying if a potential node is a start node of a sub-tree.

36. A computer program as claimed in claim 27, in which said junction nodes are linked to any number of junction nodes or data nodes and in which said data nodes are linked to a single junction node.

37. A computer program as claimed in claim 27, in which said syntactical statement comprises a textual string.

* * * * *

UNITED STATES PATENT AND TRADEMARK OFFICE
CERTIFICATE OF CORRECTION

PATENT NO. : 7,065,753 B2
APPLICATION NO. : 09/930598
DATED : June 20, 2006
INVENTOR(S) : A. J. Osborne It is certified that error appears in the above-identified patent and that said Letters Patent is hereby corrected as shown below:

Column 9
Line 2, replace "as" with --is--

Column 11
Line 32, replace "free" with --tree--

Column 12
Line 3, replace "sotre" with --store--
Line 32, replace "sub-free" with --sub-tree--

Signed and Sealed this

Ninth Day of February, 2010

David J. Kappos
*Director of the United States Patent and Trademark Office*